Patented June 23, 1942

2,287,513

UNITED STATES PATENT OFFICE 2,287,513

TILE BINDER

Frank W. Corkery, Crafton, and Ralph H. Bailey, Clairton, Pa., assignors to Pennsylvania Industrial Chemical Corporation, a corporation of Pennsylvania No Drawing. Application July 5, 1939, Serial No. 282,866

10 Claims. (Cl. 260—36)

This invention primarily relates to production of a binder material for mastic tile, and to a coumarone-indene resin for use in, or as, the mastic tile binder.

In accordance with our previous discovery, disclosed in application Serial No. 242,277, filed November 25, 1938, we have found it to be a fact that the qualities of a mastic tile depend very largely upon the character of the resin included in the tile binder rather than, as previously supposed, almost wholly in the character of the gelled oil, or pitch, which has heretofore formed the plasticizing component of the binder. In accordance with that discovery we found that if a coumarone-indene resin be composed preponderantly of relatively high polymers and relatively low polymers, it imparts to a binder composition in which it is included ability to give the tile a low rate of indentation without detracting from the elasticity of the tile. Also the performance of such a resin in a tile binder we have found to be wholly predictable, to such extent that a resin so made imparts to the binder qualities which may be anticipated from the melting point of the resin. In acting upon that discovery we have produced a resin, purposed primarily for inclusion in the binder composition of mastic tile, in which we have so minimized polymers intermediate the higher and lower coumarone and indene polymers of the resin, that the resin is capable of giving invariably a mastic tile possessing a predictable low rate of indentation.

We have now discovered that by making a coumarone-indene resin a substantial proportion of which is in a very high stage of polymerization and in which that high polymer content is plasticized with very low polymers, or an equivalent ungelled plasticizer, we have a coumarone-indene resin which is usable as the binder for mastic tile with a minimized quantity of gelled plasticizer, or without association with any gelled plasticizing substance.

It should here be explained that as heretofore made, mastic tile has consisted of a resin which has almost invariably been a coumarone-indene resin, a gelled oil, or high grade non-mineral pitch, and a filler of coloring substances, asbestos fibre, clay or the like, which commonly is generically termed pigment. In the tile the pigment, or filler, gives strength, wearing qualities, and color, while the binder gives resiliency, coherence, and water-proofing. The standard proportioning in a mastic tile is 35% binder to 65% filler, or pigment, for a soft tile; and 25% binder to 75% filler, or pigment, for a hard tile. There is some variation in this proportioning to adapt the mastic tile to climatic and other conditions of use.

The standard proportioning of the tile binder has been 70% of coumarone-indene resin and 30% high grade gelled oil, or 50% coumarone-indene resin and 50% pitch. Considering the binder more specifically, it has been heretofore impossible to eliminate, or even substantially to reduce, the proportion of the gelled oil or its equivalent pitch, and in making up the binder of coumarone-indene resin and gelled oil or pitch, it is extremely difficult to predict in advance the rate of penetration attendant upon the proportioning used. This is, as we have previously noted, due to the fact that there is in the internal composition of the resin great diversity which is reflected in the qualities of the binder in which it is included, regardless of the standardization of the gelled oil or pitch.

It has been impossible wholly to depend upon resin as a complete binder for the tile because, aside from the variation in its qualities, no coumarone-indene resin has possessed the requisite mean qualities of thermoplasticity, elasticity, and melting point. Primarily considered, the same factors which, in our prior application, lead to a coumarone-indene resin wholly and predictably suitable for inclusion in a binder for mastic tile, we have found may be carried to such extreme condition as to render the coumarone-indene resin by itself satisfactorily so usable. By including in the coumarone-indene resin a large proportion of extremely high polymers, the rate of penetration of the resin itself is rendered low beyond the ability of an adequate associated plasticizing content of low polymers, such as the oily dimers of coumarone and indene, undesirably to raise it, we have a wholly coumarone-indene resin which of itself possesses all the qualities essential in a complete tile binder. That is, it possesses a low rate of penetration coupled with elasticity adequate to enable it to plasticize the tile composition as a whole.

It is possible by careful and repeated solvent separation, in the manner disclosed in our co-pending application, to obtain from coumarone-indene resin of common commercial production a concentration of high polymers precipitating from mineral spirits at temperatures above 100° F. which, when plasticized with low polymers, may be used in increased proportion with a gelled oil or pitch to form a tile binder. We have in addition to our discovery that coumarone-indene resin in an extremely high state of polymerization can be plasticized with low polymers of the same sort to give a tile binder, further found that a high-polymer resin, suitable for such purpose, may economically be made on a commercial scale.

We have found that certain types of anhydrous metallic halides are suitable as catalysts in producing coumarone-indene resin in a particularly high stage of polymerization. These halides are the halides of metals which are capable of a valency greater than 3, and as examples of them we may give: stannic tetrachloride, antimony pentachloride, arsenic pentabromide, titanium tetrachloride, and the like chlorides, fluorides, bromides, and iodides. Such halides, as indicated in the examples, should normally be those in which the metal exerts its maximum valency.

In effecting the desired high stage polymerization by means of such catalyst, we operate under temperature conditions which tend to produce the higher polymers, and in a concentration of the unsaturates in the starting material adequate to cause an active polymerization reaction. Thus, we have discovered that in a starting material, such as crude solvent naphtha containing approximately 30% to 40% of the unsaturates, if the reaction temperature be controlled below an upper limit of about 40° C., we produce a total yield of resin having a melting point of approximately 175° C. (ball and ring). By limiting the reaction temperature to about 10° C., we obtain a coumarone-indene resin having a melting point of about 190° C. (ball and ring). Examples of our procedure in producing an extremely high-polymer coumarone-indene resin may be given as follows:

Example No. 1

Cuts of crude solvent naphtha were blended to give a crude solvent blend having a 40% concentration of unsaturates. This starting material was placed in a vessel provided with cooling coils and agitating means, and was chilled to 10° C. Anhydrous stannic chloride was slowly run in, until the total weight of the introduced catalyst was equal to 5% of the weight of the unsaturates in the starting material. The temperature was controlled below about 15° C. by circulation through the cooling coils, and because of the relatively slow catalytic action of the stannic chloride no difficulty was experienced in maintaining that low temperature level. Agitation was continued, under such temperature control, for approximately 5 to 10 hours, depending on slight temperature variations; at the end of which time the starting material had been changed into a very viscous solution of resin polymers in the liquid solvent.

The solution of resin polymers was then thinned with refined solvent naphtha in a weight equal to 40% the weight of the starting material, and was warmed to about 70° C. The tin tetrachloride was then washed out with cold water, and that wash was followed by a cold wash with 66° Be. sulphuric acid in a weight equal to about 1.5% the weight of the polymerized mixture. This was run off, and a second wash of 10% sodium hydroxide solution in water was given to complete neutralization. The mixture was allowed to settle, and this second wash was run off. By distilling the washed solution of resin polymers up to the first appearance of dipolymer oil, a total yield of resin was obtained, which is light in color being approximately color 1 on the paracoumarone resin color scale, and which has a melting point of about 190° C. (ball and ring).

In the procedure, we have found the polymerization to be such that, at the stated concentrations, the entire charge becomes highly viscous. Because of the inherent difficulties in handling very viscous materials, it is undesirable that the concentration of unsaturates in the starting material should substantially exceed the concentrations stated in the above example.

It will be observed that the resin resulted from the treatment comprises approximately the total content of unsaturates in the starting material, and that it contains the entire series of polymers formed by the polymerization reaction. In spite of these facts, however, the resin has in each case an extremely high melting point, due to the specialized procedure by which it is formed. We have found that the product has an average molecular weight of over 3000, which shows an average polymerization to the 27th stage. This indicates that the product has a greatly preponderating content of polymers which are, in the commercial sense, in an extremely high stage of polymerization.

We have found that, the molecular weight of the high polymer resin being so high, it may for our purpose be plasticized with a proportionally great quantity of low polymers. Thus, we have found it possible to plasticize the high polymer coumarone-indene resin with a relatively great proportional quantity of dipolymer oil, having a melting point of −70° C., to give a resin of moderately high melting point and low rate of penetration, coupled with such loss of thermoplasticity that it has an abnormally high viscosity at temperatures higher than its melting point. Whereas the coumarone-indene resins of common production become truly fluid at temperatures higher than the melting point of each resin, coumarone-indene resins blended of very high polymers and very low polymers tend to remain gummy rather than to become thin liquids, at high temperatures. This is true even of the blends having what may be considered relatively low melting points.

While the blended resins soften sufficiently to comply with the melting point tests for coumarone-indene resins, such as the determination by the ball and ring method, or by the cube in mercury method, this softening does not proceed in a normally progressive manner at temperatures higher than this melting, or softening, point. As defined in terms of penetration, it means that, following the accepted penetration tests, the penetration at 115° F. does not greatly exceed the penetration at 77° F., since even below their melting points the blended resins do not progressively soften at progressively higher temperatures to the extent normal with coumarone-indene resins of common commercial production.

Example No. 2

Taking specifically the product of Example No. 1, namely a coumarone-indene resin having a melting point of 190° C. This was mixed with coumarone-indene dipolymer oil in the proportion of 100 parts by weight of the high melting resin to 85 parts by weight of the dipolymer oil. The resultant resin has a melting point of 85° C., coupled with an average molecular weight of almost 1700, and without having lost its resin qualities has in measure the characteristics of an oily solid possessing some elasticity. At 115° F., under a 200 gram load for 5 seconds, this resin has a penetration of about 12, as compared with a penetration of 30 or more under similar conditions for a coumarone-indene resin of usual production, and having a melting point of 85° C. The rate of penetration of the resin, arrived at by comparing the penetration at varying time periods such as 1 minute and 10 minutes, is very low as compared with even the best resins of common production heretofore used in a binder composition for mastic tile. This blended resin is wholly satisfactory for use as the entire binder in mastic tile, giving a mastic tile which in all respects meets government specifications. In its inclusion in mastic tile, it may be combined with the pigment, or filler, within the entire range in which binder composition and pigment, or filler, have heretofore been combined in mastic tile.

We have found that while the blended resin of Example No. 2 is substantially an optimum resin for use alone as a mastic tile binder, the proportion of dipolymer oil to the 190° C. melting point resin may be increased to give a blended resin of melting point substantially lower than 85° C. without so increasing the rate of penetration of the resin as to restrict its use as a mastic tile binder. Thus we have used blended resin having a melting point slightly below 80° C. with wholly satisfactory results.

By coumarone-indene resins of "usual" or "common" production, as mentioned herein for purposes of comparison, we mean those coumarone-indene resins produced by the catalytic effect of sulphuric acid, aluminum chloride, or by the polymerization-promoting effect of substances substantially equivalent catalytically to sulphuric acid or aluminum chloride. These resins, as the result of polymerization, contain a series of polymers beginning with the dimers, and including polymers in all stages of polymerization up to those of moderately high molecular weight, but do not contain any great proportion of very high polymers. They are brought to a relatively high melting point by distilling off a relatively great proportion of their dimers, and possibly some entrained trimers, distilling below about 360° C.

In illustration we may give what may be considered standard high grade coumarone-indene resins of that sort, as follows: "Nevindene," made by The Neville Company, in Neville Island, Pennsylvania, having a color 1 to 1.5 on the paracoumarone resin color scale, a melting point of about 155° C. (cube in mercury) or about 130° C. (ball and ring), and a molecular weight of approximately 600; "Neville R-39," made by The Neville Company, in Neville Island, Pennsylvania, having about a color 4, on the paracoumarone resin color scale, a melting point of about 120° C. (cube in mercury), or about 100° C. (ball and ring), and a molecular weight of approximately 550; "T-3 Cumar" made by the Barrett Company, Philadelphia, Pennsylvania, having about a color 3 on the paracoumarone resin color scale, a melting point of about 112° C. (ball and ring), and a molecular weight of approximately 625; "T-5 Cumar," made by the Barrett Company in Philadelphia, Pennsylvania, having about a color 5 on the paracoumarone resin color scale, a melting point of about 100° C. (ball and ring), and a molecular weight of approximately 550; "450H" coumarone-indene resin, made by Pennsylvania Industrial Chemical Corporation, in Clairton, Pennsylvania, having about a color 3 on the paracoumarone resin color scale, a melting point of about 112° C. (ball and ring), and a molecular weight of approximately 625; "420" coumarone-indene resin, made by Pennsylvania Industrial Chemical Corporation in Clairton, Pennsylvania, having about a color 4 on the paracoumarone resin color scale, a melting point of 100° C. (ball and ring), and a molecular weight of approximately 550.

The foregoing resins are all high grade standard coumarone-indene resins, and the five last named are specifically considered mastic tile resins. If we assume that the "T-5" resin given above be included in a tile binder with a very highly gelled linseed oil, in a standard proportion of 70% resin to 30% gelled oil, the gelled oil having an average molecular weight of about 3500, and the resin as noted having an average molecular weight of about 550, the average molecular weight of the composition would be about 1435 and the melting point of the composition would be about 100° C. (ball and ring).

Comparing the above with the resin blend of Example No. 2, it will be noted that the molecular weight of the blend given in Example No. 2 is about 1700, and its melting point is about 85° C. In the resin blend this numerical ratio between the average molecular weight of the blend and the melting point of the blend is greater than in the composition of gelled linseed oil with a coumarone-indene tile resin as used in standard prior practice; being about 20:1, on the basis of a ball and ring melting point, as compared with about 15:1 on the same basis for the mixture of prior standard resin and gelled oil.

It may be said that for a tile binder we have replaced the gel structure previously included in the form of a gelled oil by an equivalent to a gel—produced by blending such coumarone-indene polymers that the difference in molecular weight of the components is so great as to impart to the blend a coupling of physical qualities usually found only in a gelled oil or pitch.

A tile binder must have a melting point sufficiently high that it does not so soften at 115° F., as to acquire a greater measure of softness than is represented by a penetration of 20 to 30 under a 200 gram load for five seconds. It must be light in color; and it must be so pliable in a thin film, as for instance in a film 3/1000 of an inch thick on paper, that the coated paper can be handled without powdering or cracking the film. The standard tile binders previously made have melting points of about 170° F., and a penetration at 115° F., with 200 gram load for 5 seconds, of about 20 to 30, and are pliable in a thin film. The resin blends have melting points of about 175° F. to 185° F., and their penetration at 115° F., under a 200 gram load for 5 seconds, is from 10 to 20. They are pliable in a thin film.

In addition, the blended resin binders are extremely light in color, as compared with previous resins and gelled oils used in mastic tile, having an average color intensity of approximately color 1 on the coumarone-indene resin color scale, whereas the binders made from gelled oils and resins now in use have a color range of about 4 to 7. A further comparison will show that the resin binder has much greater alkali resistance than a binder made from a gelled oil and a resin, and has excellent wetting power, due to the presence of a substantial proportion of very low polymers which are extremely good wetting agents. In addition, a further advantage is derived from the fact that the very highly polymerized forms of coumarone and indene are insoluble in paraffin hydrocarbons. These high polymers protect the low polymers against solvents, and consequently the all-resin binders are more resistant to oils, grease, and the like, than are the binder compositions previously used in mastic tile. A further advantage of the all-resin binders is that, due to their content of extremely high polymers, they are usable in the softer grades of tile, giving a tile which is very flexible to conform to unevenness in surfaces to which the tile is applied, while retaining a very low rate of indentation.

Taking a linseed oil containing about 70% of unsaturated glycerides having more than one double bond, and about 30% of olein and stearin, on polymerization to gelatin the gel would contain 70% of high polymers and 30% of monomers, or molecules approximating the molecular weight of monomers. In our previous application, we have shown that a coumarone-indene resin used in the binder of mastic tile should consist at least 40%, and preferably 50%, of high polymers, in order to give it an appropriately low rate of penetration for inclusion in a tile binder. A tile binder of the prior sort, containing 70% resin and 30% gelled oil would usually contain about 50% of high polymers, none of those supplied by the resin being extremely high.

Since the coumarone-indene resins previously used in tile binders have varied widely and unpredictably in their content of high polymers, and in the polymerization stage of those polymers which may be considered "high", the qualities of the binders containing them have been variable and unpredictable. Prior to our discoveries, as has been noted, the cause of such variability was not known, and the results of combining stated proportions of resin and gelled oils were not predictable. Our resin blends contain more than 50% high polymers, and those high polymers are in an extremely high state of polymerization. The effect of such a blended resin, as a binder, is therefore, predictable, and by following appropriate methods of polymerization in the production of the high polymers and a proportioned blending of the high polymers and low polymers, their characteristics are controllably imparted to the resin blends. They are, therefore, well suited of themselves to supply in a tile binder the content of high polymers necessary to give the binder a low penetration at temperatures above normal room temperature, although sufficient plasticizer of ungelled sort be included with the high polymers to give the qualities appropriate to a tile binder.

Bearing in mind that we attain our object by plasticizing a coumarone-indene resin containing a very high proportion of very high polymers, the plasticizing content of the blend may be supplied by substances which in the blend are approximately equivalent to the described low polymer content of coumarone-indene resin. Thus we may plasticize the high polymer resin with oils which are compatible with the resin and which boil above 300° C., or which, if the oil be in the form of a soft solid, will melt below 20° C. Examples of oils, and oil-like materials, which may be used to plasticize the high polymer resin are linseed oil, China-wood oil, castor oil, candelilla wax, japan wax, di-amyl phthalate, di-butyl phthalate, tri-cresyl phosphate, di-butyl tartrate, acetyl-ricinoleate, low-melting glycerol phthalate, resin esters, various esters of acids and alcohols, and the lower polymers of unsaturated hydrocarbons other than the lower polymers of coumarone and indene.

It is, of course, to be understood that, if it should be so desired, the extremely high polymer resin may be plastized in whole or in part with gelled oil. What we have done is to render the use of gelled oil in a tile binder unnecessary. The use of any gelled oil is in some respects disadvantageous. This is because gelled oils are extremely difficult to handle in preparation for use and in use, while the resin and ungelled oils, either as lower polymers of the resin or otherwise supplied, are very easy to handle. Because of the particularly high moisture-resistance of gelled oils, noticeably higher than that of ungelled oils, it is, however, desirable sometimes to use more or less gelled oil in the binder composition. A tile binder in accordance with the following formula has excellent moisture resistance:

| | Parts by weight |
|---|---|
| Coumarone indene resin, M. P. 170°–190° | 50 |
| Coumarone indene dimers | 25 |
| Gelled linseed oil | 25 |

Another formula, and mode of arriving at it, may be given and explained as follows:

First a high-polymer coumarone-indene resin is made, as above described, for example a resin of such high polymerization that when recovered in solid state, it would have a melting point (ball and ring) of about 190° C. As it is difficult to recover this resin from the still in solid form, coumarone-indene dipolymer oil (or one of its above-noted equivalents) is added in the still before the solvent associated with the resin is distilled off. This permits the resin to be recovered in a condition of fluidity at the still temperature. Thus, to the 190° C. M. P. resin, there are added 15 parts by weight of the dimers to each 45 parts by weight of the high-melting resin, to give a resin of about 130° C. melting point. This resin may be further plasticized by an oil-like ungelled plasticizer, such as coumarone-indene dipolymer oil and its equivalents, or with a gelled oil or a pitch. The gelled oil, or common non-mineral pitch, may be equivalently represented by a pitch consisting of equal parts of coumarone-indene dipolymer oil and fish oil, oxidized by blowing them in admixture.

A good formula for the tile binder, using the above ingredients, may be given as follows:

| | Parts by weight |
|---|---|
| Coumarone-indene resin, M. P. 130° C. (45 parts 190° C.–15 parts dipolymer oil) | 60 |
| Pitch (50 parts dipolymer oil–50 parts fish oil) | 40 |

In this formula the ungelled oil is the dipolymer oil associated with the high polymers of coumarone and indene, while the pitch in substantial equivalency replaces the gelled oil.

The foregoing formula and explanation illustrate the fact that the coumarone-indene resin need at no stage physically exist as a resin consisting in substantial entirety of high polymers. It is sufficient that there be present in the resin a large proportion of polymers which, if isolated, would be of the specified high melting point. This will be understood by comparison with the standard commercial coumarone-indene resin given above, which have a very small content of polymers in sufficiently high stages of polymerization to give a melting point even as high as 140° C. (ball and ring); that is, a very small content of polymers in higher than the 7th or 8th stages of polymerization. Those resins, as explained, depend for their melting points upon eliminating or minimizing dimers.

The foregoing description of recovering high polymer coumarone-indene resin by plasticizing it with dimers in the still, is to be taken as part of the disclosure of our method of making high-melting coumarone-indene resin.

As above explained, a gelled oil increases the moisture resistance of the binder, and we may therefore use it in whole, or in part, as the plasticizer. As also explained the use of a gelled oil is unnecessary to the extent that its high polymers are replaced by the high polymers of the coumarone-indene resin.

It has been noted that the binder compositions for mastic tile previously in use have had molecular weights as high as about 1435. For soft tile, however, they have frequently had an average molecular weight of approximately 1000. The use of extremely high polymers of coumarone and indene gives great control in the qualities of the tile binder, without departing from the properties considered necessary in a tile binder.

It may be explained that the molecular weight of all the oil-like equivalents for dipolymer oil which have been given is close to the approximate molecular weight of coumarone-indene dipolymer oil. That is, their molecular weight is within the approximate range of 200 to 300, as compared with an approximate molecular weight of 226 for the dipolymer oil. In the definition of the resin blend, or tile binder, containing these equivalents by molecular weight, any variation in molecular weight from the analogous product containing dipolymer oil per se is so slight as to be inconsiderable.

It may be stated generally that in order to be usable with certainty as a tile binder, unassociated with any content of gelled oil, the binder should consist at least about 60% its weight of high coumarone-indene polymers if they be of an order capable of giving, when isolated, a resin having a melting point approximately as high as 165° C., and an average molecular weight of about 1600. This gives a blend having an average molecular weight somewhat in excess of 1050, and a melting point of about 79° C., with dipolymer oil consisting of coumarone-indene dimers having a very small content of coumarone-indene trimers.

An ungelled binder in which the high polymers of coumarone and indene are associated only with coumarone-indene dipolymer oil or its equivalent, should have an average molecular weight exceeding 1000, coupled with a melting point within the range 75° C. to 105° C. (ball and ring), in order that it be considered wholly satisfactory.

The foregoing example of a tile binder is one which is on the border line of being satisfactorily usable alone as the binder composition of mastic tile. An example much further from that border line is to make a resin blend consisting 55% of coumarone-indene resin having a melting point of about 180° C. and an average molecular weight of about 2100, with 45% coumarone-indene dipolymer oil. This gives a blend usable as a tile binder composition, having an average molecular weight of about 1200, and a melting point of about 85° C.

This latter explanatory example is in its nature intermediate the resin blend, or tile binder of Example No. 2, and our example, or definition, above given, of a resin blend which represents an approximation to a permissible minimum of the properties making the blend usable by itself as a tile binder.

It is to be understood that in the specification and claims wherever melting point is not definitely associated with a method of determining it, it is determined by the ball and ring softening point method. The term "penetration" as herein used is applied to resin and to binder, and is determined by the New York Testing Laboratory penetrometer. The term "indentation" as herein used refers to the standard practice employed in respect to mastic tile in determining compliance with government specifications. As the term "blend," or "resin blend" is used herein, it is to be taken as meaning a blend of the high polymers of coumarone and indene with either coumarone-indene dipolymer oil, or one of the ungelled equivalents for it. It is not to be taken as including any gelled content, either in the form of a pure gelled oil, or in the form of a non-mineral pitch, or synthetic pitch.

We claim as our invention:

1. A tile binder composition for mastic tile consisting essentially of high molecular weight coumarone-indene polymers having an average molecular weight above 1000, and a non-volatile unctuous plasticizer boiling above 300° C. and melting below 20° C. compatible with the said high molecular weight coumarone-indene polymers, the said tile binder composition as a whole being characterized by a penetration of less than 30 under a 200 gram load for 5 seconds at a temperature of 115° F. and by the property of pliability in a thin film.

2. A tile binder composition for mastic tile consisting essentially of high molecular weight coumarone-indene polymers having a melting point not substantially below 165° C. and an unctuous non-vc˙ tile plasticizer boiling above 300° C. and melting below 20° C. compatible with the said coumarone-indene polymers, the said tile binder composition having a melting point within the approximate range of 75° C. to 105° C.

3. A tile binder composition for mastic tile consisting essentially of high molecular weight coumarone-indene polymers and non-volatile unctuous plasticizing liquid boiling above 300° C. compatible with the said high molecular weight coumarone-indene polymers, the said high molecular weight content of the composition including sufficient coumarone-indene polymers having a melting point not substantially below 165° C. with respect to the said non-volatile unctuous plasticizing liquid to give it a penetration of less than 30 under a 200 gram load for 5 seconds at a temperature of 115° F., the said binder composition being characterized further by the property of pliability in a thin film.

4. A tile binder composition for mastic tile consisting essentially of high molecular weight coumarone-indene polymers having an average molecular weight from about 1600 to 3000 with low molecular weight coumarone-indene polymers having an average molecular weight within the approximate range of 200 to 300, the said tile binder composition having an average molecular weight within the approximate range of 1000 to 1700.

5. A tile binder composition for mastic tile consisting essentially of high molecular weight coumarone-indene polymers having an average molecular weight from about 1600 to 3000 with a non-volatile unctuous plasticizing material boiling above 300° C. and having a melting point below 20° C. compatible with the high molecular weight coumarone-indene polymers, the said tile binder composition having an average molecular weight within the approximate range of 1000 to 1700.

6. A tile binder composition for mastic tile consisting essentially of high molecular weight coumarone-indene polymers having an average molecular weight from about 1600 to 3000 with an unctuous non-volatile plasticizer having an average molecular weight within the approximate range of 200 to 300 which is compatible with the said high molecular weight coumarone-indene polymers, the said tile binder composition having an average molecular weight within the approximate range of 1000 to 1700.

7. A tile binder composition for mastic tile consisting essentially of high molecular weight coumarone-indene polymers having an average molecular weight above 1000, and a non-volatile unctuous plasticizer having an average molecular weight within the approximate range of 200 to 300 which is compatible with the said high molecular weight coumarone-indene polymers, the said tile binder composition as a whole being characterized by a penetration of less than 30 under a 200 gram load for 5 seconds at a temperature of 115° F. and by the property of pliability in a thin film.

8. A tile binder composition melting below 120° C. which is a blend consisting in substantial entirety of high molecular weight coumarone and indene polymers melting not substantially lower than 140° C. and a non-volatile unctuous plasticizer boiling above 300° C. and melting below 20° C. compatible with the said high molecular weight coumarone-indene polymers, the said blend consisting more than 40% of the above designated high melting and high molecular weight coumarone-indene polymers.

9. A tile binder composition melting below 120° C. which is a blend consisting in substantial entirety of coumarone and indene polymers so high in molecular weight as to precipitate from mineral spirits at temperatures above 100° F., and a non-volatile unctuous plasticizer boiling above 300° C. and melting below 20° C. compatible with the said high molecular weight coumarone-indene polymers.

10. A tile binder composition which is a blend consisting in substantial entirety of coumarone and indene polymers so high in molecular weight as to precipitate from mineral spirits at temperatures above 100° F., and a non-volatile unctuous plasticizer boiling above 300° C. and melting below 20° C. compatible with the said high molecular weight coumarone-indene polymers, the said blend consisting more than 40% of the above designated high molecular weight coumarone-indene polymers.

FRANK W. CORKERY.
RALPH H. BAILEY.